Figures 1, 2:
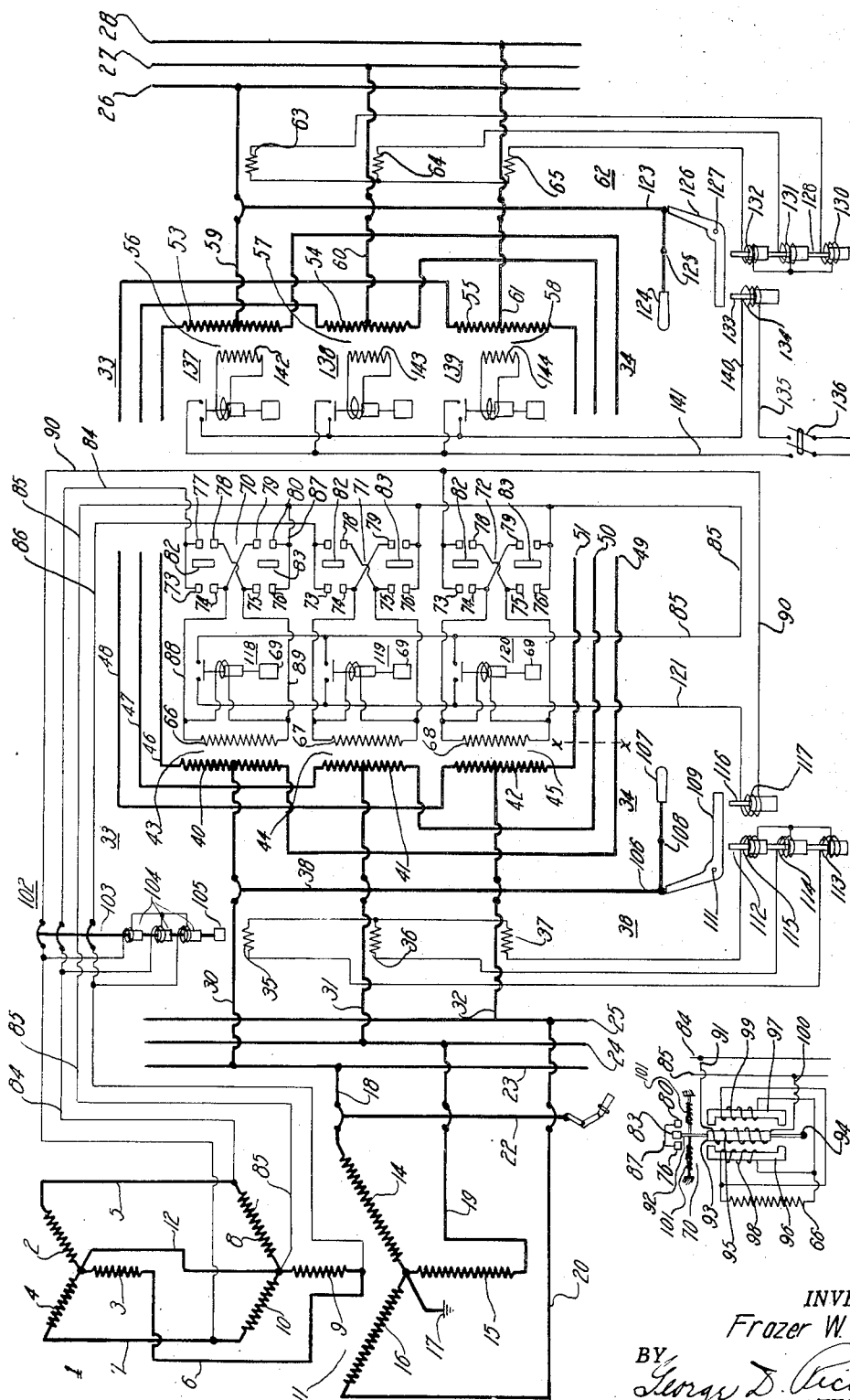

July 4, 1933.  F. W. GAY  1,916,925
POWER TRANSMISSION SYSTEM
Filed Sept. 7, 1929

INVENTOR.
Frazer W. Gay,
BY George D. Richards
ATTORNEY.

Patented July 4, 1933

1,916,925

UNITED STATES PATENT OFFICE

FRAZER W. GAY, OF NEWARK, NEW JERSEY

POWER TRANSMISSION SYSTEM

Application filed September 7, 1929. Serial No. 390,899.

This invention relates, generally, to the transmission of electric power; and the invention has reference, more particularly, to a novel power transmission system that is so constructed and arranged as to inherently protect its transmission lines against destructive short circuit currents and having means for bringing a faulty line to ground potential to thereby eliminate arcing grounds and resulting damage.

Substantially all troubles operating to render high voltage transmission lines unreliable have been eliminated or overcome with the exception of lightning. Electric failures due to lightning have quite generally been charged to an act of God and all hope of fully protecting a transmission system against them has been well nigh abandoned. Since the electric stresses caused by lightning are from five to ten times the normal line voltage value, to adequately insulate transmission lines and their terminal equipment to stand such enormous electric stresses to ground is hardly possible in view of the tremendous expense involved and the doubtful performance of such a system. Furthermore, it has not been found practicable to protect a transmission system against the severe short circuit currents that generally follow a lightning discharge over an insulator except by opening the circuit breakers at each end of the affected line, which method requires the best part of a second to clear the line. The presence of a severe short circuit on a system for so long an interval as a second frequently causes synchronous machines to fall out of step and stability may be lost, thereby shutting down a considerable portion of the system. The affected line may also have to be overhauled before it may again carry power.

Current induced by a lightning stroke and arcing over an insulator is limited to a few thousand amperes maximum for a few microseconds, while in large systems the power arc that follows such a lightning induced arc over will generally be several times as great in magnitude and nearly always will be sustained many thousand times as long. Insulators can be built economically to stand the heat produced by an arc over induced by lightning, but so far it has not been feasible to build an insulator that will not be either destroyed or severely injured by the power arc that follows an arc induced by lightning.

In my copending application Serial No. 312,085, there is disclosed means by which a power arc may be prevented from flowing into a line fault and which limits the current flowing into the fault to the relatively small geometric sum of the magnetizing current and the line charging current. Also, there is disclosed how this small current may be entirely eliminated by short circuiting and grounding the faulty line at both ends.

The principal object of the present invention is to provide a novel power transmission system wherein the transmission lines and their terminal equipment need only be insulated to withstand not more than two times the normal voltage value to ground, and which is so constructed and arranged as to enable a transmission line to be repeatedly arced over by lightning during a single storm without the necessity of disconnecting the line from the system, and having means for preventing a lightning arc over an insulator from being maintained by the line power voltage.

In carrying out the invention with reference to a three-phase transmission system, three transformers or a three phase bank are employed at the sending station and the same at the receiving station. The mid-points of the high tension windings of the sending station transformers are connected respectively to the respective conductors of the sending station bus, while the mid-points of the high tension windings of the receiving station transformers are similarly connected respectively to the respective conductors of the receiving station bus. Three similar high tension end winding points of the sending station transformers are connected respectively through a three phase transmission line to three similar high tension end winding points of the receiving station transformers, while the remaining three high tension end winding points of the sending station transformers are connected respectively through a twin three phase transmission line to the remaining three high tension end winding points of the receiving station transformers. A three phase failure on one of these transmission lines immediately causes the entire power to be carried by the other line operating at twice normal voltage.

The three transformers at the sending station are equipped with low voltage windings of sufficient capacity to carry the magnetizing current and the charging current to that line which is working at double voltage. When a considerable voltage is suddenly induced across such a low voltage winding as upon the occurrence of a line fault, means is provided to connect such low voltage and capacity winding immediately to a voltage source having the same phase and polarity as the induced voltage so that the line conductor that is in trouble is immediately brought to substantially ground potential. If all three phases of one of the twin transmission lines are in trouble, then all three phase conductors of this line are simultaneously brought to ground potential and held there for several cycles, so as to thereby eliminate the electromotive force which would otherwise cause a ground or three phase fault to continue. The low capacity winding is then open circuited and the line that was in difficulty will again resume its share of the load.

The transmission lines are equipped with voltage relays at their ends which relays are actuated by voltage induced across the transformers and will trip the main oil switch in case the voltage across any transformer is maintained for longer than sufficient time to allow the functioning of the arc suppressing mechanism.

Transmission systems now commonly used generally have their transformer neutrals either solidly grounded or else connected through a high resistance or reactance to ground. With transformer neutrals solidly grounded, the amount of current flowing into a ground fault is enormous and its destructive effects proportional whereas with the transformer neutrals connected through a resistance or reactance to ground the current that flows to a single ground fault is limited to a less destructive value during the period of the fault, but the non-grounded phases of the entire system, which may involve hundreds of miles of lines not near the faulty line are pushed to 1.73 times normal potential at every single phase arc over. Such a searching test of the system has been known to produce simultaneous faults at widely divergent points, resulting in greatly increased damage and duration of system outage.

In using the transmission system of the present invention, should a single ground fault occur, the resulting voltage disturbance is limited to the conductor in trouble and to its complementary conductor in the twin transmission line. Thus, instead of raising two adjacent conductors of the entire system to 1.73 times normal voltage, the voltage on one conductor of one transmission line only is raised to two times normal voltage. The voltage on the remainder of the system is not disturbed. It will be apparent to those skilled in the art that the two twin transmission lines should preferably be geographically spaced apart somewhat so that serious atmospheric disturbances in the presence of one transmission line will not extend to the vicinity of the other. Such spacing apart of the twin lines is not essential, however, for in practice it has been found that even where lines are closely adjacent, faults do not generally occur simultaneously on both lines.

Other objects of this invention, not at this time more particularly enumerated, will be clearly understood from the following detailed description of the same.

The invention is clearly illustrated in the accompanying drawing, in which:—

Fig. 1 is a wiring diagram illustrating one form of the novel power transmission system of this invention; and Fig. 2 is a wiring diagram illustrating the manner of connecting a selector switch in the transmission system.

Similar characters of reference are employed in all of the hereinabove described views, to indicate corresponding parts.

Referring now to Fig. 1 of the said drawing, the reference character 1 designates a three phase power generator having windings 2, 3 and 4 connected respectively, by leads 5, 6 and 7 to the primary windings 8, 9 and 10 of a power transformer 11. The neutral connection of windings 2, 3 and 4 is illustrated as joined as by a neutral lead 12 to the neutral connection of windings 8, 9 and 10. The neutral connection of the high voltage secondary windings 14, 15 and 16 of transformer 11 is connected solidly to the ground 17. Secondary windings 14, 15 and 16 are connected by leads 18, 19 and 20 through the conventional circuit breaker 22 to the high voltage power station bus 23, 24 and 25. Power station bus 23, 24 and 25 may be supplied with electric energy from one or more of the generators 1 and this bus is adapted to pass this energy on to one or more pairs of twin transmission lines that are in turn connected to a substation bus 26, 27 and 28. A single pair of twin transmission lines 33 and 34 is illustrated as connected to the bus 23, 24 and 25.

Power station bus 23, 24 and 25 is connected by supply leads 30, 31 and 32 through current transformers 35, 36 and 37 and a circuit breaker 38 to the mid-taps of the high voltage windings 40, 41 and 42 of three transformers 43, 44 and 45. The conductors 46, 47 and 48 of transmission line or cable 33 are connected respectively to corresponding end terminals of windings 40, 41 and 42, while conductors 49, 50 and 51 of transmission line 34 are connected respectively to the remaining end terminals of these windings.

Each of the conductors 46, 47, 48, 49, 50 and 51 normally carry one half of the energy supplied by the transformer winding 40, 41 or 42 to which it is connected. This distribution of the load by the transformers 43 to 45 causes line 33 to carry one half of the transmitted electric energy and line 34 the other half thereof. The lines or cables 33 and 34 would ordinarily traverse different routes and may be of considerable length and the conductors of these lines are shown broken in Fig. 1 to indicate such length. Since the routes of these lines are ordinarily different, the possibility of simultaneous injury to both of them resulting in a simultaneous short circuit of their conductors is exceedingly remote.

The delivery ends of twin lines 33 and 34 are brought into the desired substation and the conductors of these cables are connected to the end terminals of high voltage windings 53, 54 and 55 of transformers 56, 57 and 58 that are similar to transformers 43 to 45. The mid-taps of windings 53, 54 and 55 are connected by terminal leads 59, 60 and 61 through a circuit breaker 62 and current transformers 63, 64 and 65 to the substation bus 26, 27 and 28.

Transformers 43, 44 and 45 have low voltage secondary windings 66, 67 and 68 which are adapted to be respectively connected in multiple with the primary windings 8, 9 and 10 of the power transformer 11 through the use of suitable selector switches 70, 71 and 72. Selector switches 70, 71 and 72 are all of the same well known construction and therefore only one of them, namely selector switch 70, will be described in detail.

Selector switch 70 comprises a plurality of contacts 73, 74, 75 and 76 and reversing contacts 77, 78, 79 and 80 which are adapted to be engaged by vibrating switch members 82 and 83. Contact 73 and reversing contact 77 are connected by a conductor 84 to one terminal of the primary winding 8 of power transformer 11. Contact 76 and reversing contact 80 are connected by a conductor 87 and neutral conductor 85 to the other terminal of primary winding 8. Contact 74 and reversing contact 79 are connected by a conductor 88 to one end of the low voltage secondary winding 66 while contact 75 and reversing contact 78 are connected by a conductor 89 to the other end of winding 66. When switch member 82 engages contacts 73 and 74 and switch member 83 simultaneously engages contacts 75 and 76, the low voltage secondary winding 66 is connected in parallel by conductors 88 and 84 at one side and conductors 89, 87 and 85 at the other side with primary winding 8 of power transformer 11. When switch members 82 and 83 engage reversing contacts 77 to 80 the low voltage winding 66 is again connected in parallel with primary winding 8 but in the reverse direction or polarity from that obtaining when switch members 82 and 83 engage contacts 73 to 76. Similarly switch members 82 and 83 of selector switch 71 are adapted to connect low voltage winding 67 in parallel in either polarity with primary winding 9. Also switch members 82 and 83 of selector switch 72 are adapted to connect low voltage winding 68 in parallel in either polarity with primary winding 10.

Referring to Fig. 2, a portion of the selector switch 70 is shown diagrammatically in end elevation. Contacts 76 and 80 are alone shown in this figure, the remaining contacts being in alignment therewith. Also, switch member 83 is shown but member 82 is not shown since this member is in alignment with member 83. Switch members 82 and 83 are independently connected as by insulating rods 92 to an armature 93 that has a depending supporting stem pivotally mounted at 94. Armature 93 has a winding 95 thereon which is permanently connected across the terminals of the primary winding 8 of the power transformer 11 by leads 91, 84 and 100, 85. Armature 93 is adapted to be swung about its pivotal point 94 by electromagnets 96 and 97. The windings 98 and 99 of electromagnets 96 and 97 are connected across the terminals of low voltage secondary winding 66 and are arranged in magnetically boosting relation with respect to one another. Armature 93 is normally retained in a vertical position centrally between electromagnets 96 and 97 by the action of centering springs 101.

The electromagnet windings of selector switches 71 and 72 are respectively connected across their corresponding low voltage secondary windings 67 and 68 and the armature windings of these switches are respectively connected in parallel with primary windings 9 and 10 similarly to the connections for selector switch 70.

A circuit breaker 102 is connected in leads 84, 85, 86 and 90 and its breaker arm 103 is actuated by a three phase magnet 104 connected to leads 84, 86 and 90. This circuit breaker is normally closed and when an exciting current flows in any one or all of the leads 84, 86 and 90 this circuit breaker rises or opens immediately, but upon the cessation of the exciting current it falls or closes relatively slowly due to the use of a dash pot 105.

The breaker arm 106 of circuit breaker 38 is pivotally connected to the hand operating lever 107 fulcrumed at 108. Breaker arm 106 is normally held in its up or closed position by a latch 109 pivotally mounted at 111. A plunger 112 is positioned below latch 109 and has cores with three phase tripping coils 113, 114 and 115 thereon connected to the current transformers 35, 36 and 37. In case of a severe short circuit on bus 26, 27 and 28, for example, the current from transformers 35, 36 and 37 causes plunger 112 to strike and swing latch 109 counter-clockwise as viewed in Fig. 1, thereby permitting breaker arm 106 to fall and open the circuit breaker 38.

A plunger 116 is also positioned below latch 109 and has a tripping coil 117 connected at one side by lead 90 to a suitable source of power, illustrated as an end of primary winding 10 and at its other side this tripping coil is connected by lead 121 to contacts of time relays 118, 119 and 120. The remaining contacts of these time relays are connected by neutral lead 85 to the other end of winding 10. The actuating coils of time relays 118, 119 and 120 are respectively connected permanently across low voltage secondary windings 66, 67 and 68. Dash pots 69 retard the upward or closing movement of these time relays.

The breaker arm 123 of circuit breaker 62 is pivotally connected to the hand operating lever 124 fulcrumed at 125. Breaker arm 123 is normally held in its up or closed position by a latch 126 pivotally mounted at 127. A plunger 128 is positioned below latch 126 and has cores with three phase tripping coils 130, 131 and 132 thereon connected to the current transformers 63, 64 and 65. In case of a severe short circuit on or beyond bus 26, 27 and 28, for example, the current from transformers 63, 64 and 65 causes plunger 128 to strike and swing latch 126 clockwise as viewed in Fig. 1, thereby effecting the opening of circuit breaker 62.

A plunger 133 is also positioned below latch 126 and has a tripping coil 134 connected at one side by lead 135 and switch 136 to a source of power and at its other side by lead 140 to contacts of time relays 137, 138 and 139 similar to time relays 118, 119 and 120. The remaining contacts of time relays 137 to 139 are connected to the source of power by lead 141 and switch 136. The actuating coils of time relays 137, 138 and 139 are respectively connected permanently across low voltage secondary windings 142, 143 and 144 of transformers 56, 57 and 58.

In operation, the electrical energy developed by generator 1 is transmitted over leads 5, 6 and 7 to the primary winding of the transformer 11. The high tension currents leaving the secondary winding of transformer 11, flow over leads 18, 19 and 20 through circuit breaker 22 to the power station bus 23, 24 and 25. Leads 30, 31 and 32 conduct current from the bus 23, 24 and 25 through current transformers 35, 36 and 37 and circuit breaker 38 to the midpoints of the high voltage windings 40, 41 and 42 of transformers 43, 44 and 45. The currents supplied by leads 30, 31 and 32 are equally divided in each phase within the windings 40, 41 and 42. One half of the current in each phase passes in one direction through its corresponding transformer winding and the remainder passes through the winding in the opposite direction. This results in one half of the phase currents flowing through conductors 46, 47 and 48 of transmission line 33 and the other half of such currents flowing through conductors 49, 50 and 51 of line 34. The thusly divided phase currents are again united at the receiving substation by high voltage windings 53, 54 and 55 of transformers 56, 57 and 58. These united phase currents are then delivered by leads 59, 60 and 61 through circuit breaker 62 and current transformers 63, 64 and 65 to the substation bus 26, 27 and 28. The voltage drop between circuit breaker 38 and circuit breaker 62 will be that due to the impedance of the transformers which may be relatively low, together with that of the transmission lines 33 and 34.

Should either of the transmission lines 33 or 34 become grounded or short-circuited at some point of its length between the power station and substation, then the remaining non-faulty transmission line will automatically carry the total load while operating at twice normal voltage. This may be shown by assuming, for example, that line 34 is grounded at X—X as the result of a lightning arc over insulators. Under such grounded and short-circuited condition, the halves of the high voltage windings of the transformers 43 to 45 and 56 to 58 that are connected to conductors 49, 50 and 51 become star connected. The thusly star connected lower halves of windings 40 to 42 and 53 to 55 (see Fig. 1) serve to immediately excite the upper halves of these windings to double voltage, thereby causing transmission line 33 to carry the entire load.

Currents still divide at the midpoints of transformer windings 40, 41 and 42 as before the arc over and substantially half of these currents flow through the upper halves of the windings 40, 41 and 42 into line 33 while the remainder flows through the lower halves of these windings into line 34. Owing to the presence of the fault at X—X, the potential drop across the lower halves of these windings is equal substantially to the normal line voltage and this drop in voltage in the lower halves of the windings causes the currents in the upper halves to emerge therefrom and enter line 33 at twice normal voltage. Substantially all of the currents entering conductors 49, 50 and 51 flow along the conductors past the fault X—X just as though this fault did not exist. These currents are neutralizing currents flowing from the neutrals of the transformer windings 40, 41, 42, 53, 54 and 55.

It is evident that these neutral currents have the same value and direction on both sides of the fault X—X since they are substantially counterparts of the power currents flowing in conductors 46, 47 and 48.

Momentarily there will be relatively small currents flowing between conductors 49, 50 and 51 at the fault X—X constituting the star connection for the lower halves of windings 49, 50 and 51, which currents are those necessary for magnetizing the transformers 43, 44 and 45 and for charging line 33. The star connected lower halves of these windings also serve to cause the excitation of low voltage windings 66, 67 and 68. The low voltage windings 66, 67 and 68 are respectively so wound that the voltages induced across them are substantially the same as those across primary windings 8, 9 and 10 respectively. It will be noted that the voltages of windings 8, 9 and 10 are respectively applied by means of leads 84, 85, 86 and 90 across the outer contacts of selector switches 70, 71 and 73. Currents from the low voltage windings 66, 67 and 68 immediately upon the occurrence of the fault excite the electromagnet windings 98 and 99 of each of the selector switches 70, 71 and 72. Since the movable armatures 93 of the switches 70, 71 and 72 have their windings 95 continuously excited by current supplied from windings 8, 9 and 10 respectively, these armatures are instantly operated by electromagnets 96 and 97 of the selector switches to cause switch members 82 and 83 to engage either contacts 73 to 76 or contacts 77 to 88 as may be necessary to parallel windings 8, 9 and 10 with windings 66, 67 and 68 respectively in the correct polarity relation. With the low voltage windings 66, 67 and 68 connected to windings 8, 9 and 10, these latter windings will immediately supply through the low voltage windings the necessary magnetizing and line charging current to the transformers 43, 44 and 45 since the impedance of the current path between windings 8, 9, 10 and 66, 67 and 68 is far less than that through the lower halves of windings 40, 41 and 42 and between the conductors 49, 50 and 51 at the fault X—X. Thus, through the operation of selector switches 70, 71 and 72 the magnetizing current for the transformers 43 to 45 and the line charging current for line 33 is prevented from flowing between the conductors at the fault X—X. Since these conductors are immediately brought to substantially ground potential, substantially all tendency for the arc over to continue over these conductors is eliminated, thereby protecting insulators and associated equipment from serious injury. The operation of these selector switches takes place almost immediately upon the occurrence of the fault, so that after the first lightning arc over, the line is immediately brought to substantially ground potential and current is prevented from flowing from conductor to conductor at the fault.

The exciting currents flowing in leads 84, 85, 86 and 90 upon the connection of windings 8, 9 and 10 to windings 66, 67 and 68 cause circuit breaker 102 to open. After opening, the circuit breaker 102 commences to close immediately but its closing movement is retarded by the action of dash pot 105 so that there will be an interval of a fraction of a second during which time leads 84, 85, 86 and 90 are open. If fault X—X has been removed by bringing conductors 49, 50 and 51 momentarily to ground potential, then when leads 84, 85, 86 and 90 are thus opened the transformers 43 to 45 are no longer magnetized and the load will again divide equally between lines 33 and 34. Selector switches 70 to 72 will open and remain open, thereby disconnecting windings 8, 9 and 10 permanently from windings 66, 67 and 68. On the other hand, if the fault X—X has not been removed upon the reclosing of circuit breaker 102, then the time relays 118, 119 and 120, will shortly close causing the excitation of tripping coil 117 and the consequent operation of circuit breaker 38 to disconnect transformers 43 to 45 and lines 33 and 34 from power bus 23, 24 and 25.

The energization of low voltage windings 142, 143 and 144 of transformers 56 to 58 upon the occurrence of the fault at X—X causes time relays 137, 138 and 139 to commence to close and if the fault is not cleared within the desired time by the automatic action of the system, then these time relays will close, causing the energization of tripping coil 134 and the operation of circuit breaker 62 to disconnect transformers 56, 57 and 58 and lines 33 and 34 from substation bus 26, 27 and 28.

Should a fault occur on line 33 instead of line 34 then line 34 will be raised to twice normal voltage, whereas line 33 will become grounded at the fault and windings 8, 9 and 10 will supply the magnetizing current for the transformers 43 to 45 as well as the charging current for line 34. If the fault has cleared by the time circuit breaker 102 opens the faulty line will again take its share of the load. Should the fault fail to clear up within the allowed time, then time relays 118 to 120 and 137 to 139 will operate to disconnect the twin lines from the station busses.

In the event that the fault occurs on but a single conductor, as for example, the conductor 49 at X—X, then the complementary conductor 46 of line 33 alone is raised to twice normal voltage while conductors 50 and 51 continue to carry their share of the load and winding 8 supplies the magnetizing and charging current through low voltage winding 66. Likewise, when a fault occurs on but two conductors of a line, the complementary phase conductors of the twin line carry the power load of the faulty conductors.

It will thus be noted that by employing the novel transmission system of this invention, the enormous short circuit currents ordinarily flowing into faults together with their attendant extensive reduction on line voltages are eliminated. Also, synchronous machinery is prevented from falling out of step and loss of stability and extensive shut downs are prevented.

Also, in using the novel transmission system of the present invention, the common destruction of insulators, lines and hardware at the point of fault is prevented.

Owing to the automatic shifting of the load from one transmission line to a twin line upon the occurrence of a fault and the later automatic return of the load to the faulty line, it is unnecessary to rupture short circuit currents or to employ oil circuit breakers for this purpose, which breakers may explode while operating.

Also it is not necessary to disconnect a line to clear an arc over as is the common practice at present.

The present invention eliminates the great expense involved in insulating transmission lines to many times normal voltage to withstand lightning arc overs. Also, the enormous expense of insulating terminal equipment to withstand lightning brought to such equipment on over insulated lines is avoided.

It is to be understood that there are many instances in the operation of a transmission system when it is desirable to reduce the voltage on one conductor or even one of the twin lines of the system to substantially zero potential. In such cases if the cores of the transmission line transformers 43 to 45 are made of sufficient cross section to carry flux for the desired length of time, the reduction in voltage may be accomplished by blocking over the switch members 82 and 83 and blocking in circuit breaker 103, whereupon the necessary magnetizing current will be supplied to windings 66 to 68 from windings 2, 3 and 4.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:—

1. A transmission system comprising, a sending station bus, a receiving station bus, a plurality of transmission lines having conductors connecting said station busses, a plurality of transformers having winding elements, certain of which winding elements are included in said transmission lines intermediate said station busses, and control means utilizing certain of said transformer winding elements for causing the transformers to reduce the voltage on a faulty line conductor to substantially ground potential.

2. A transmission system comprising, a plurality of transmission lines having line conductors, transformers having winding elements, certain of said winding elements being connected to said transmission line conductors for transferring the voltage ordinarily carried by one line conductor to a conductor of another line upon the occurrence of a fault on said first line conductor, a control circuit, said transformers having winding elements associated with others of said transformer winding elements and connected in said control circuit for causing said transformers to reduce the voltage on a faulty line conductor to ground potential.

3. A transmission system comprising, a station bus, a plurality of transmission lines connected to said bus for conveying power therefrom, a plurality of transformers having cores with windings thereon, certain of said transformer windings being connected to said transmission lines and arranged on said cores so that the magneto-motive force induced in each core is substantially zero during normal load and operation and others of said transformer windings being arranged on said cores for supplying magnetizing current to said transformers upon the occurrence of a fault on one of said transmission lines.

4. A transmission system comprising, a power station bus conductor, a transformer having a high voltage winding connected to said bus conductor, twin transmission lines having conductors respectively connected to the respective ends of said high voltage winding, said transformer having a low voltage winding inductively associated with said high voltage winding, and control means comprising a control circuit connected to said low voltage winding for causing said latter winding to effect a reduction in the voltage of one of said transmission line conductors to substantially ground potential.

5. A transmission system comprising, a power station bus conductor, a power source having a winding for supplying electrical energy to said bus conductor, a transformer having winding elements, certain of said winding elements being connected to said bus conductor, twin transmission lines having conductors connected through said certain winding elements to said bus conductor, and a circuit for connecting one of said transformer winding elements in parallel with said power source winding to thereby cause one of said transmission line conductors to be brought to ground potential.

6. A transmission system comprising, a generator having polyphase windings, a polyphase station bus having bus conductors, a polyphase power transformer having primary windings connected respectively to one of said generator windings and secondary windings connected respectively to one of said bus conductors, said secondary windings having their neutral connection grounded, a pair of polyphase transmission lines, each having a plurality of phase conductors, a plurality of transmission line transformers corresponding in number to the number of phase conductors in each bus, each of said line transformers having a continuous winding with a mid-tap connected to one of said bus phase conductors, the ends of each said winding being connected to a phase conductor of each of said transmission lines, each of said line transformers having an additional low voltage winding and a control circuit connected to said additional low voltage windings, said control circuit serving as a path for capacity and magnetizing currents in the event of a fault on one of said transmission lines.

7. A transmission system comprising, a generator having polyphase windings, a polyphase station bus having bus conductors, a polyphase power transformer having primary windings connected respectively to one of said generator windings and secondary windings connected respectively to one of said bus conductors, said secondary windings having their neutral connection grounded, a pair of polyphase transmission lines, each having a plurality of phase conductors, a plurality of transmission line transformers corresponding in number to the number of phase conductors in each bus, each of said line transformers having a continuous winding with a mid-tap connected to one of said bus phase conductors, the ends of each of said windings being connected to a phase conductor of each of said transmission lines, each of said line transformers having an additional low voltage winding, and control means for connecting each of said low voltage windings in multiple with one of the primary windings of said power transformer.

8. A transmission system comprising, a generator having polyphase windings, a polyphase station bus having bus conductors, a polyphase power transformer having primary windings connected respectively to one of said generator windings and secondary windings connected respectively to one of said bus conductors, said secondary windings having their neutral connection grounded, a pair of polyphase transmission lines, each having a plurality of phase conductors, a plurality of transmission line transformers corresponding in number to the number of phase conductors in each bus, each of said line transformers having a continuous winding with a mid-tap connected to one of said bus phase conductors, the ends of each said winding being connected to a phase conductor of each of said transmission lines, each of said line transformers having an additional low voltage winding, control means comprising selector switches and circuits extending between said selector switches and the primary windings of said power transformer for connecting one of said low voltage windings in multiple with one of the power transformer windings.

9. A transmission system comprising, a generator having polyphase windings, a polyphase station bus having bus conductors, a polyphase power transformer having primary windings connected respectively to one of said generator windings and secondary windings connected respectively to one of said bus conductors, said secondary windings having their neutral connection grounded, a pair of polyphase transmission lines, each having a plurality of phase conductors, a plurality of transmission line transformers corresponding in number to the number of phase conductors in each bus, each of said line transformers having a continuous winding with a mid-tap connected to one of said bus phase conductors, the ends of each said winding being connected to a phase conductor of each of said transmission lines, each of said line transformers having an additional low voltage winding, control means comprising selector switches and circuits extending between said selector switches and the primary windings of said power transformer for connecting one of said low voltage windings in multiple with one of the power transformer windings, and time relay means connected across said low voltage windings for effecting the disconnection of said transmission lines from said power station bus.

In testimony, that I claim the invention set forth above I have hereunto set my hand this 4th day of September, 1929.

FRAZER W. GAY.